United States Patent [19]
Brayman et al.

[11] Patent Number: 5,949,803
[45] Date of Patent: Sep. 7, 1999

[54] METHOD FOR THE EXPOSURE OF LASER SENSITIVE MATERIALS WITHOUT THE EFFECTS OF INTERMITTENCY

[75] Inventors: Howard C. Brayman, Pittsford; Mark S. Prichard, Rochester; John P. Spoonhower, Webster, all of N.Y.; Nicholas Touchard, Chalon sur Saone; Thierry Vachette, Esbarres, both of France

[73] Assignee: Eastman Kodak Company, Rochester, N.Y.

[21] Appl. No.: 09/064,379

[22] Filed: Apr. 22, 1998

[51] Int. Cl.$^6$ ....................................................... H01S 3/10
[52] U.S. Cl. ............................... 372/24; 372/53; 372/54; 372/15; 372/25; 372/32
[58] Field of Search .................................. 372/24, 53, 54, 372/15, 32, 25; 356/256; H01S 3/10

[56] References Cited

U.S. PATENT DOCUMENTS 3,677,653  7/1972  Hocker et al. .
5,053,619  10/1991  Arimoto .

*Primary Examiner*—Robert H. Kim
*Assistant Examiner*—Layla Lauchman
*Attorney, Agent, or Firm*—Raymond L. Owens

[57] ABSTRACT

A method for exposing light sensitive material to provide exposure patches representing the material sensitivity and which minimizes the effects of intermittency of the light sensitive material, including providing a source of laser light by producing a laser light beam by a continuous wave pump laser which produces a first beam of light and a continuous wave dye laser responsive to the beam of light to produce a second beam of light having gaussian intensity distributions in two orthogonal directions; shaping the second light beam so as to produce a substantially square wave intensity distribution in one direction, while the other direction has a gaussian distribution; and scanning the shaped second light beam through a target of different uniform densities and onto light sensitive material so as to produce a series of exposure patches in one scan of different densities but with the density in each exposure patch being uniform, whereby the effect of intermittency in the light sensitive material is minimized.

5 Claims, 5 Drawing Sheets

METHOD FOR THE EXPOSURE OF LASER SENSITIVE MATERIALS WITHOUT THE EFFECTS OF INTERMITTENCY

FIELD OF THE INVENTION

The present invention relates to producing exposure patches on light sensitive material for minimizing intermittency of such light sensitive material.

BACKGROUND OF THE INVENTION

Laser sensitometers are used to generate a series of controlled exposures on a sample of light sensitive material so as to produce exposure patches representative of the sensitivity of such light sensitive material. Typically, these exposure patches are used to measure the response of photographic materials as a function of radiant density.

U.S. Pat. No. 3,677,653, which issued to Hocker, et al on Jul. 14, 1972, discloses a method of exposing photographic material to produce exposure patches. Towards this end the disclosed method in the '653 patent uses a combination of a laser and a negative lens system.

U.S. Pat. No. 5,053,619, which issued to Arimto on Oct. 7, 1991, discloses a variable density scanning apparatus, which includes a semiconductor laser, a dynamic diffraction grating, and a rotating polygonal mirror. The apparatus produces an appropriate exposure as a series of individual dot exposures, also known as a raster scan. A drive circuit is used to change the dot density of the individual exposures.

These patents both suffer from certain limitations. In U.S. Pat. No. 3,677,653, uniform exposures are extremely difficult to produce. Also, the use of a diverging lens in the optical system limits the overall power delivered to the exposure plane.

The U.S. Pat. No. 5,053,619 overcomes the problem of uniform exposure and high density by employing raster scan technology. However, the overlap of dots inherent to raster scan technology produces a complex exposure pattern on the test sample, which causes exposure patterns to have a number of undesirable effects caused by intennittency of the material. Consequently, the subject matter of this patent cannot be used to measure intermittency and reciprocity failure effects on the sample.

A further limitation of both of these systems is that a change in the exposure wavelength requires replacement of the laser system.

SUMMARY OF THE INVENTION

It is an object of the present invention to provide exposure patches of uniform density on light sensitive material which minimize the problems of intermittency in the light sensitive material.

It is a further object of the present invention to expose a series of exposure patches on light sensitive material to measure the effects of intermittency.

It is also an object of the present invention to overcome the limitations of existing low power sensitometers by using a high irradiance exposure.

It is a further object of the present invention to deliver uniform, high energy exposure in a short time duration.

It is still another object of the present invention to permit variable wavelength exposures.

These objects are achieved by a method for exposing light sensitive material to provide exposure patches representing the material sensitivity and which minimizes the effects of intermittency of the light sensitive material, comprising the steps of:

(a) providing a source of laser light by producing a laser light beam by a continuous wave pump laser which produces a first beam of light;

(b) a continuous wave dye laser responsive to the beam of light to produce a second beam of light having gaussian intensity distributions in two orthogonal directions;

(c) shaping the second light beam so as to produce a substantially square wave intensity distribution in one direction, while the other direction has a gaussian distribution; and (d) scanning the shaped second light beam through a target of different uniform densities and onto light sensitive material so as to produce a series of exposure patches in one scan of different densities but with the density in each exposure patch being uniform, whereby the effect of intermittency in the exposure patches of the light sensitive material is minimized.

A feature of the present invention, is to scan a shaped laser light beam through a variable density target to make exposure patches on test material in a single exposure. This permits the production of an exposure patch of the desired density in a single scan, so the effects of intermittency are substantially minimized or eliminated. Further, multiple scans can then be used so the effects of intermittency can than be studied in a controlled manner.

An advantage of the laser sensitometer apparatus according to the present invention is its ability to deliver a high intensity, uniform exposure, without requiring raster scan technology.

It is another advantage of the present invention that the apparatus can deliver the exposure in a short time duration.

It is another advantage of the present invention that variable wavelengths can be used when exposing the target material.

DETAILED DESCRIPTION OF THE PREFERRED EMBODIMENTS

Figure 1:
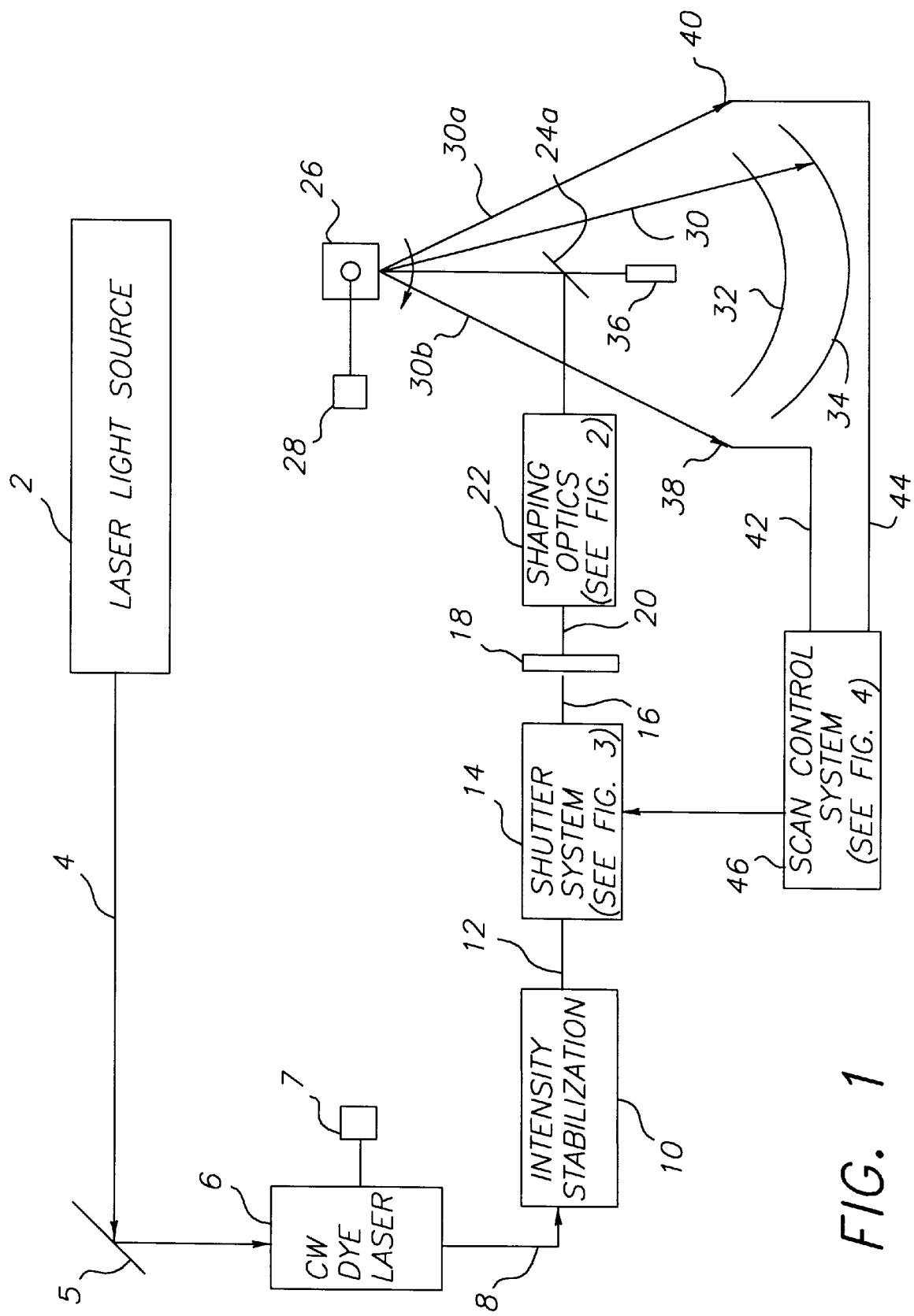
FIG. 1 is a schematic diagram which depicts a system for exposing a plurality of exposure patches on light sensitive material in accordance with the present invention.

It has been found that light sensitive materials can exhibit a property so that the effect of a single continuous exposure at a given irradiance and time does not produce the same effect as a series of multiple, short exposures which when integrated have the same energy as the original continuous exposure. This failure of light sensitive materials to integrate multiple exposures is called "intermittency".

In a preferred embodiment of the present invention, an apparatus is disclosed which employs a high powered argon ion laser light source 2. The argon ion laser light source 2 acts as a pump source for a continuous wave dye laser 6 which operates in a conventional manner understood by those skilled in the art.

The continuous wave dye laser 6, pumped by the laser light 4 from the argon ion laser light source 2, directed by mirror 5 to selectively produce variable wavelength exposures. A tuning control 7 is adapted to operate the continuous wave dye laser 6 such that it produces an output of a frequency selected by a user. Such type of control is conventional and well understood by those skilled in the art and need not be discussed here. The beam of light 8 from the continuous wave dye laser 6 is incident upon intensity stabilization 10, which includes optics and electronics well known and commercially available, and which function to stabilize the intensity of the laser light beam 12 which is directed to a shutter system 14. The shutter system 14 is used to control exposure intensity and duration of the laser light beam 16 exiting the shutter system 14. Shutter system 14 will be described in some detail later in reference to FIG. 3. Cross polarizers 18 operate on the laser light beam 16 to permit adjustment of the laser light beam 16 intensity.

The light beam 20 is shaped by shaping optics 22 and is directed to a mirror 24a which in turn directs the shaped beam to a mirrored surface of a rotating polygon 26. The polygon 26 is driven by a control motor 28. Light is delivered by the polygon 26 through a target 32 and then exposes light sensitive material 34 to provide exposure patches. The target 32 is shown in more detail in FIG. 5. The target 32 is quite conventional and includes a series of uniform density patches sometimes referred to as step tablets. Each density patch has a uniform density but will have a density that is different from an adjacent exposure patch or patches. The laser light beam 8 produced at the output of the continuous wave dye laser 6 has gaussian intensity distributions in two orthogonal directions as will be understood by those skilled in the art. An important feature of the present invention is the recognition that this laser light beam 8 is shaped by shaping optics 22 so as to produce a substantially square wave intensity distribution in one orthogonal direction, while the remaining orthogonal direction continues to have a gaussian distribution. This shaping function provides a high intensity exposure of the light sensitive material 34 when the laser light beam 30 is scanned through the target 32. It is because of the shaping of the laser light beam 24 and the single scan of the target 32 produced by the polygon 26 that a single series of exposure patches is produced in the light sensitive material 34 in which intermittency is minimized. The polygon 26 will be understood to include a selected number of facets and each facet face corresponds to a single scan of target 32.

Figure 5:
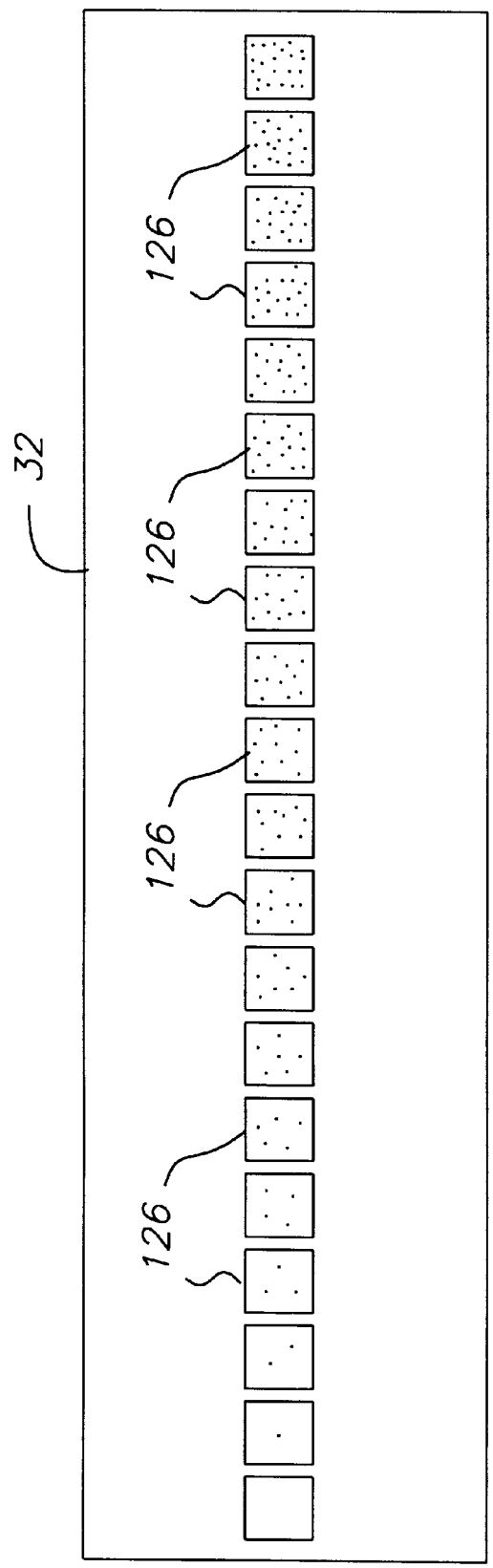
FIG. 5 is a plan view representative of exposure patches made in accordance with the present invention.

Referring now to FIG. 5 the target 32 is a variable density target having a series of uniform density distributions which correspond to exposure patches 126 to be produced. The variable density target 32 is conventional and can be made from black and white photographic material, which is exposed in a controlled fashion to create a series of uniform density patches. The exposure patch 126 size is sufficient to permit measurement of the resulting exposure on the light sensitive materials by conventional macrodensitometry equipment. The target 32, and hence the exposure pattern on the light sensitive material 34 includes 21 patches, each of which can be 5 mm×5 mm in size.

Referring now to FIG. 1, a diode laser 36 is used in conjunction with light detectors 38 and 40 to provide start of line and end of line timing control input signals 42 and 44 to scan control system 46. The scan control system 46 is shown in detail in FIG. 4 and is used to operate the shutter system 14.

Figure 2:
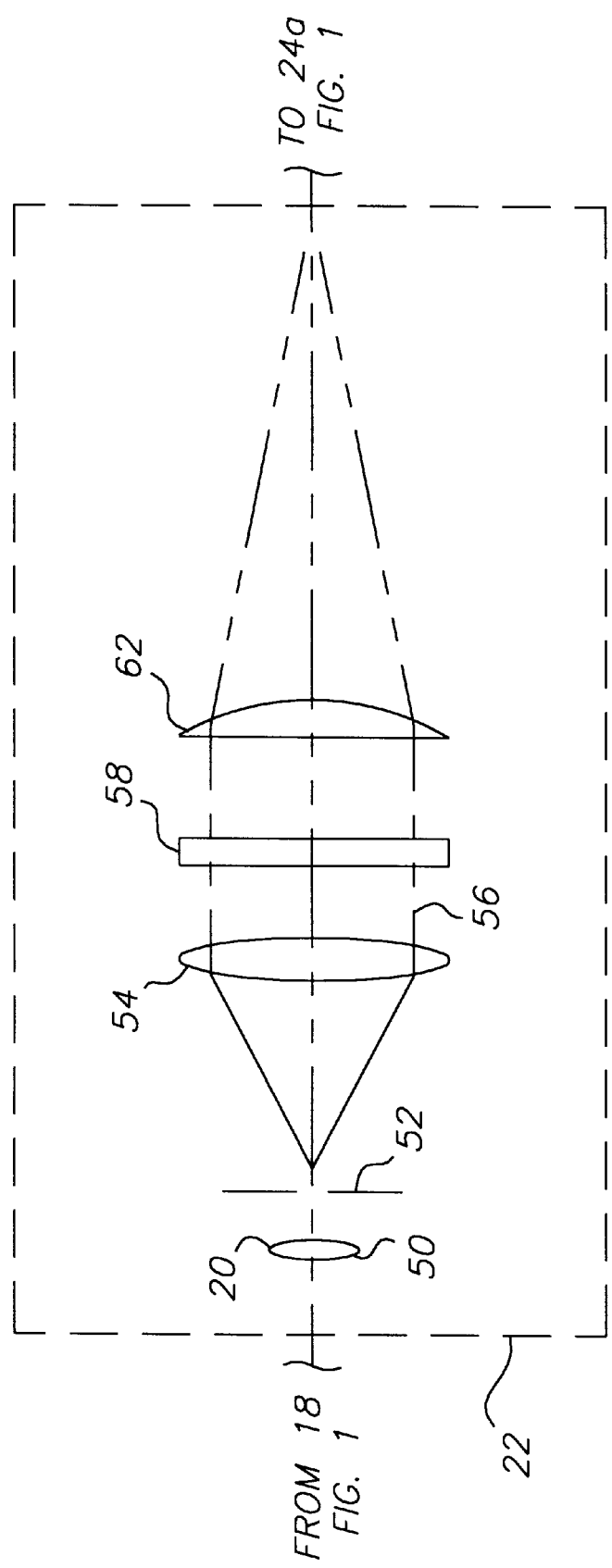
FIG. 2 is a more detailed schematic diagram of the shaping optics shown in FIG. 1.

Turning to FIG. 2 which shows a detail of the optical elements 50, 52, 54, 58 and 62 which provides a more complete schematic of the shaping optics 22. Optical element 52 is a mask which has an aperture which provides the function of a spatial filter which removes high spatial frequency noise. The optical elements 50 and 54 which are lenses cooperate to expand the cross sectional area of the light beam 56. The light beam 56 leaving optical element 54 is a highly collimated beam of light. Optical elements 58 and 62 which also are lenses are used to shape the light beam 56 and provide square wave intensity distribution in one orthogonal direction. Optical element 58 is used to shape the square wave intensity distribution, while optical element 62 is used to focus the beam into the desired slit shape. The function of the shaping optics 22 is to produce a beam of light which has a gaussian intensity distribution in one orthogonal direction and a square wave intensity distribution in the other orthogonal direction.

Figure 3:
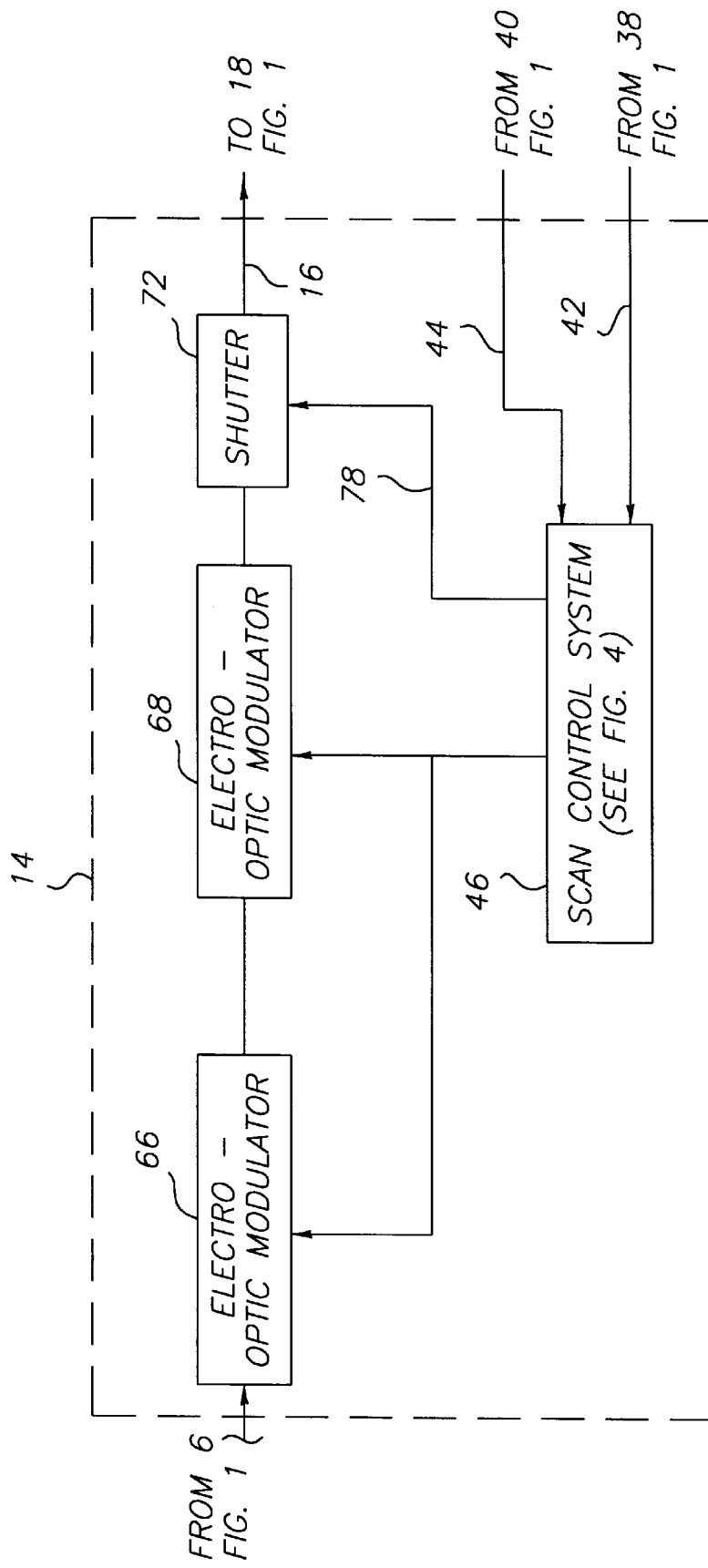
FIG. 3 is a more detailed schematic diagram of the shutter system shown in FIG. 1.

FIG. 3 is a more detailed description of the shutter system 14 shown in FIG. 1. Two electro-optic modulators 66 and 68, provide the structure which rapidly opens and blocks the incoming laser light beam 12 and thus controls the exposure of the light sensitive material 34. Either one or two electro-optic modulators 66 and 68 may be used depending on the extinction requirements of the exposure; two modulators in series provide for a higher extinction of the light beam in the "off" state than a single module provides. The electro-optic modulators 66 and 68 typically include polarizing optics and an electro-optic or "Pockels" cell. An electro-mechanical shutter 72 controlled by a signal of a lead 78 provides for total extinction of the laser light beam. The timing sequence which is used to control the opening and closing of these shutters is produced by the scan control system 46. Inputs to the scan control system 46, comes from detectors 38 and 40 shown in FIG. 1.

Figure 4:
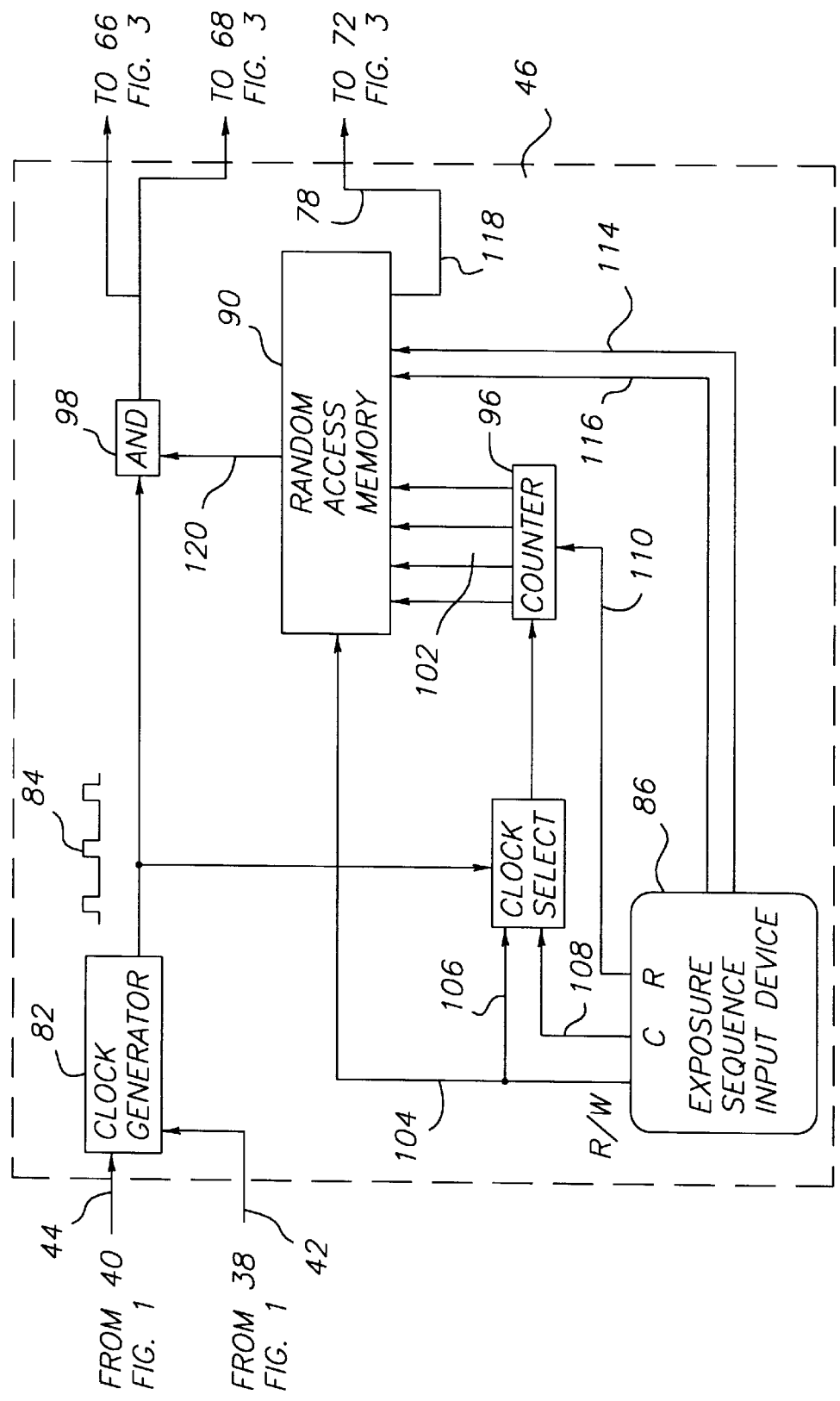
FIG. 4 is a more detailed schematic diagram of the scan control logic shown in FIG. 1.

FIG. 4 shows a more detailed view of the scan control system 46. As an input to the pulse generator 82 are the start and end of line signals from detectors 38 and 40 respectively. The pulse generator 82 produces a clock 84 having square shaped pulses. The leading edge of each pulse is coincident with the start of line signal and whose trailing edge is coincident with the end of line signal. The clock 84 is applied to an AND gate 98 and clock select 100. The clock select 100 provides a signal to counter 96. The counter 96 is connected to the memory address lines 102 of random access memory 90. A reset signal R is produced by exposure sequence input device 86 and provided over lead 110 to the counter 96. Also, a clock signal C is provided over lead 108 to clock select 100. An output lead 120 is provided as an input to the AND gate 98. Over the lead 78 there is provided a control signal for controlling the electro-mechanical shutter 72 in FIG. 3. The exposure sequence input device 86 provides two separate leads into the random access memory 90. The exposure sequence input device 86 provides over lead 114 the exposure control sequence for the electro-mechanical shutter 72. Similarly, the exposure sequence input device 86 provides over lead 116 the exposure sequence for the electro-optical modulators 66 and 68. When the exposure sequence is to be loaded into memory, the lead 104 provides an appropriate level voltage signal to the random access memory 90 to indicate whether information is to be read from the random access memory 90 or written into the random access memory 90. When information is to be read from the random access memory 90 and delivered to both the AND gate 98 and lead 78 the lead 104 has another predetermined voltage level.

There are two modes of operation for the scan control system 46. The first mode is a write mode where information is to be delivered to the random access memory 90. In such a mode the exposure input sequence device 86 provides the appropriate voltage level on lead 104 and signal to the clock select 100 to read in data. Data are read in over leads 114 and 116 in a manner which will be well understood to those skilled in the art. Clock select 100 is used to select the clock from the exposure sequence input device 86. This clock 84 is used to increment the counter 96 to sequentially address the random access memory 90. In the read mode the clock select 100 is used to select the clock 84 to sequence the random access memory 90. Over lead 118 is an exposure sequence for the electro mechanical shutter 72. This sequence is used to open the electro mechanical shutter 72 prior to the start of the exposure sequence being sent to the electro optic shutters 66 and 68, and then to close the electro mechanical shutter 72 at the completion of the exposure sequence of the electro optic shutters 66 and 68. Over lead 120 is an exposure sequence for the electro-optic shutters 66 and 68. When they are in coincidence with clock 84 signals are provided to electro-optic modulators 66 and 68. This sets the electro optic modulators 66 and 68 to maximum transmission during the time the laser light beam 30 is sweeping past the start light detector 40 and the stop light detector 38. When the laser light beam 30 passes the stop detector 38 the AND gate 98 is used to remove the signals from the electro-optic modulators 66 and 68, causing them to be set to a minimum transmission state.

FIG. 5 shows a more detailed view of the variable density target 32. Superimposed on the variable density target 32 are exposure patches 126. Each exposure patch 126 has a different shading indicating that it has a different uniform density.

Preferred Modes of Operation:

One preferred mode of operation for the system is the intermittency mode, whereby the system is used to deliver controlled duration exposures to the target material with a set time duration between the exposures. In this mode of operation the parameters effecting the exposure time are held constant while the time between exposures is varied using the scan control system 46. The exposure intensity may be held constant, or varied using the main optical system.

This last mode of operation is not restricted to two exposures, but may be expanded to multiple exposures with varying time intervals between them.

The second preferred mode of operation is the reciprocity mode. In this mode of operation, the product of the exposure time multiplied by the intensity at the target plane is kept constant. While the product of these two factors is kept constant, different combinations of these factors are used to expose the light sensitive material to investigate the light sensitive material's reciprocity characteristics. In this mode of operation, the intensity is controlled by elements 66 and 68 in FIG. 3. The exposure time is controlled by the rotation speed of the polygon 26 in FIG. 1, and the position of optical element 62 in FIG. 2.

The invention has been described in detail with particular reference to certain preferred embodiments thereof, but it will be understood that variations and modifications can be effected within the spirit and scope of the invention.

PARTS LIST 2 laser light source
4 laser light
5 mirror
6 continuous wave dye laser
7 tuning control
8 light beam
10 intensity stabilization
12 laser light beam
14 shutter system
16 laser light beam
18 cross polarizers
20 light beam
22 shaping optics
24 laser light beam
24a mirror
26 polygon
28 motor
30 laser light beam
32 target
34 light sensitive material
36 laser diode
38 light detectors
40 light detectors
42 input signals
44 input signals
46 scan control system
50 optical element
52 optical element
54 optical element
Parts List cont'd
56 lightbeam
58 optical element
62 optical element
66 electro-optic modulators
68 electro-optic modulators
72 electro-mechanical shutter
78 lead
82 pulse generator
84 clock
86 input device
90 random access memory
96 counter
98 AND gate
100 clock select
102 memory address lines
104 lead
110 lead
114 lead
116 lead
118 lead
120 lead
126 exposure patches

What is claimed is:

1. A method for exposing light sensitive material to provide exposure patches representing the material sensitivity and which minimizes the effects of intermittency of the light sensitive material, comprising the steps of:

(a) providing a source of laser light by producing a laser light beam by a continuous wave pump laser which produces a first beam of light;

(b) a continuous wave dye laser responsive to the beam of light to produce a second beam of light having gaussian intensity distributions in two orthogonal directions;

(c) shaping the second light beam so as to produce a substantially square wave intensity distribution in one direction, while the other direction has a gaussian distribution; and (d) scanning the shaped second light beam through a target of different uniform densities and onto light sensitive material so as to produce a series of exposure patches in one scan of different densities but with the density in each exposure patch being uniform, whereby the effect of intermittency in the exposure patches of the light sensitive material is minimized.

2. The method of claim 1 wherein the scanning step includes providing a rotatable polygon mirror which when rotated is adapted to scan the second light beam onto the light sensitive material.

3. The method of claim 1 further including the step of adjusting the frequency of the second light beam to provide wavelengths of interest.

4. A method for exposing light sensitive material to provide exposure patches representing the material sensitivity and which measures the intermittency effects of the light sensitive material, comprising the steps of:

(a) providing a source of laser light by producing a laser light beam by a continuous wave pump laser which produces a first beam of light;

(b) a continuous wave dye laser responsive to the beam of light to produce a second beam of light having gaussian intensity distributions in two orthogonal directions;

(c) shaping the second light beam so as to produce a substantially square wave intensity distribution in one direction, while the other direction has a gaussian distribution; and (d) scanning the shaped second light beam through a target of different uniform densities and onto light sensitive material so as to produce a series of exposure patches in each of the multiple scans of different densities but with the density in each exposure patch being uniform, so that the effects of intermittency in the light sensitive material are determined.

5. The method of claim 4 further including the step of adjusting the frequency of the second light beam to provide wavelengths of interest.

* * * * *